United States Patent
DeGronckel et al.

(12) 
(10) Patent No.: US 6,959,796 B2
(45) Date of Patent: Nov. 1, 2005

(54) ADJUSTABLE DAMPER WITH VALVE MOUNTED IN-LINE

(75) Inventors: Dirk DeGronckel, Diepenbeck (BE); Paul Martens, Genk (BE); Patrick Vanmechelen, Sint-Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/667,555

(22) Filed: Sep. 22, 2003

(65) Prior Publication Data

US 2005/0061593 A1   Mar. 24, 2005

(51) Int. Cl.$^7$ ................................................. F16F 9/00
(52) U.S. Cl. .................. 188/313; 188/315; 188/322.14
(58) Field of Search ................................ 188/313, 275, 188/314, 315, 318, 319.1, 322.13, 322.14

(56) References Cited

U.S. PATENT DOCUMENTS

| | | | |
|---|---|---|---|
| 3,127,958 A * | 4/1964 | Szostak | 188/275 |
| 4,054,277 A * | 10/1977 | Sirven | 267/35 |
| 4,561,524 A * | 12/1985 | Mizumukai et al. | 188/319 |
| 4,614,255 A | 9/1986 | Morita et al. | |
| 4,682,675 A * | 7/1987 | Eddy, Jr. | 188/266.2 |
| 4,834,088 A | 5/1989 | Jeanson | |
| 4,971,180 A * | 11/1990 | Kobayashi et al. | 188/319 |
| 5,027,927 A | 7/1991 | Bacardit | |
| 5,070,970 A | 12/1991 | Johnston et al. | |
| 5,113,979 A * | 5/1992 | Driessen | 188/280 |
| 5,148,896 A | 9/1992 | Ralph | |
| 5,246,092 A | 9/1993 | Yamaoka | |
| 5,279,480 A | 1/1994 | Derrien | |
| 5,293,969 A | 3/1994 | Yamaoka et al. | |
| 5,386,893 A | 2/1995 | Feigel | |
| 5,462,140 A * | 10/1995 | Cazort et al. | 188/275 |
| 5,464,079 A | 11/1995 | Lohberg et al. | |
| 5,598,903 A * | 2/1997 | Richardson | 188/275 |
| 5,618,248 A * | 4/1997 | Huang | 482/112 |
| 5,788,031 A | 8/1998 | Saito | |
| 5,799,758 A | 9/1998 | Huang | |
| 5,860,631 A | 1/1999 | Feigel | |
| 5,924,528 A | 7/1999 | Vermolen et al. | |
| 6,334,516 B1 * | 1/2002 | Shirley et al. | 188/275 |

* cited by examiner

*Primary Examiner*—Mariano Ong Sy
(74) *Attorney, Agent, or Firm*—Harness, Dickey & Pierce, PLC

(57) ABSTRACT

A damper includes an outer cylinder and an inner cylinder. The inner cylinder is disposed inside the outer cylinder and contains a rod and valve to define an upper working chamber and a lower working chamber. An adjustable valve portion fluidly communicates the upper working chamber with a reserve chamber. The adjustable valve portion is positioned inside the outer cylinder and coaxially aligned with the axis of the outer cylinder and the inner cylinder. As a result, the adjustable valve portion does not extend radially from the damper to potentially obstruct other vehicle elements or cause damage to the adjustable valve portion.

15 Claims, 4 Drawing Sheets

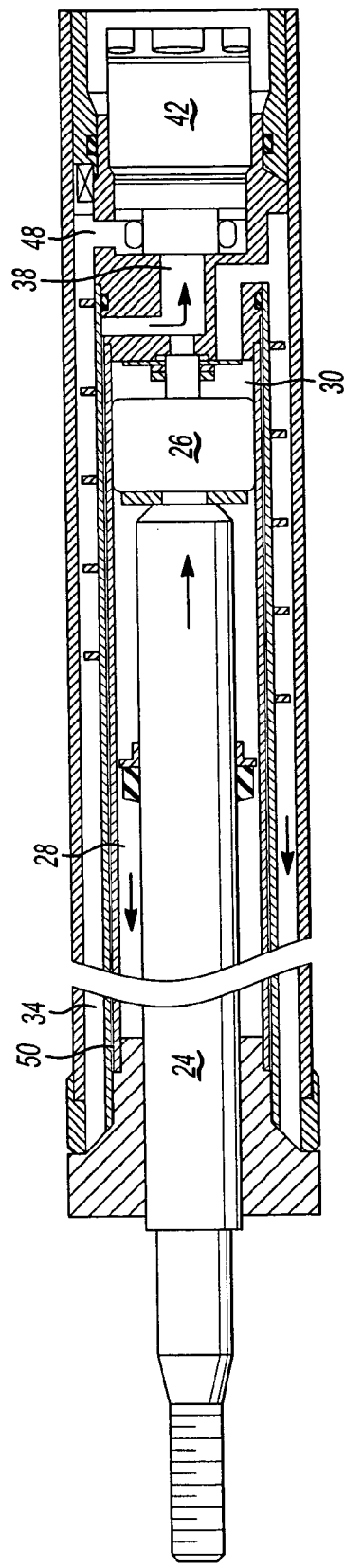
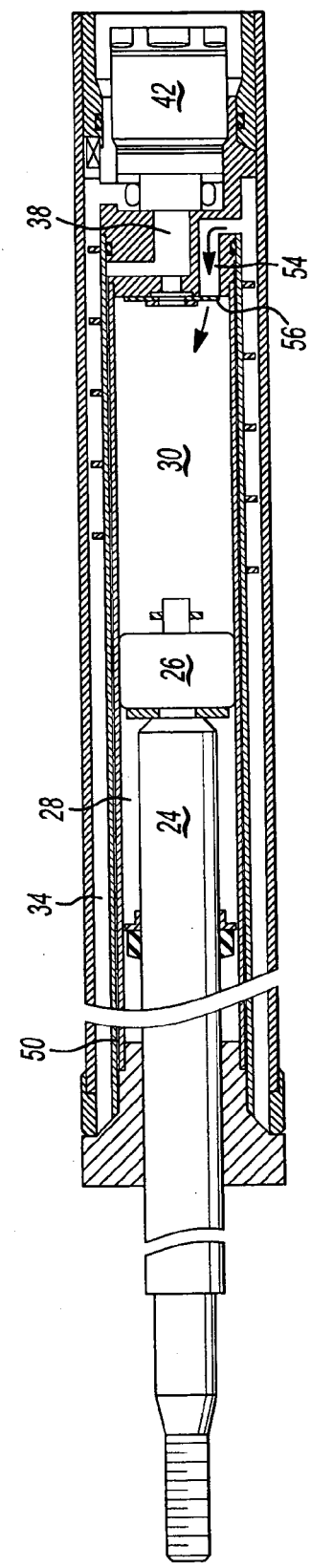

ADJUSTABLE DAMPER WITH VALVE MOUNTED IN-LINE

FIELD OF THE INVENTION

The present invention relates generally to an adjustable damper, and more particularly, to an adjustable damper with a valve mounted in-line.

BACKGROUND OF THE INVENTION

Conventionally, adjustable dampers are used on shock absorbers to adjust the damping resistance dependent upon specific external conditions. Conventional shock absorbers operate by metering the flow of fluid between chambers. Typically, shock absorbers have a central chamber with a valve slideably positioned therein. The valve is attached to the sprung mass while the cylinder, itself, is attached to the un-sprung mass (such as the vehicle wheels). Movement of the un-sprung mass moves the valve which causes fluid to move from one side of the cylinder to the other. In addition, a reserve chamber is provided for additional fluid flow. In the adjustable damper, an adjustable valve is positioned between the central tube and the reserve tube. As the adjustable valve is relatively complex in construction, especially when compared to fixed resistance valves, they require a large amount of room for mounting. Moreover, a prime location for these valves tends to be half way along the length of the damper, as they usually regulate the flow through a down tube and into the reserve tube. As such, the conventional adjustable valve typically extends radially from the central axis of the tube and regulates fluid flow between the central chamber and the reserve tube.

While this arrangement does act to provide an adjustable damper, drawbacks exist. Specifically, as the adjustable damper valve extends radially outward from the shock absorber, it can interfere with the surrounding structure of the vehicle. Moreover, this radial extension creates additional manufacturing requirements, costs and difficulties. The present invention was developed in light of these and other drawbacks.

SUMMARY OF THE INVENTION

To address these and other drawbacks, the present invention provides an adjustable valve located in line with or covered by the outer tube. Accordingly, the present invention provides an inner cylinder positioned inside an outer cylinder to define a reserve chamber. A rod is positioned within the inner cylinder and has a valve attached thereto. The area above the valve is defined as an upper working chamber while the area below the valve is defined as a lower working chamber. An adjustable valve portion is supported in a lower support, which is in turn supported by the inside wall of the outer cylinder. The adjustable valve portion regulates fluid flow from the upper working chamber to the reserve chamber. Also, by virtue of supporting the adjustable valve portion by the inside walls of the outer cylinder, the adjustable valve portion can be positioned in-line and as one unit with the entire damper.

In another aspect, the inner cylinder comprises a first inner cylinder and a second inner cylinder spaced apart by a gap. The gap feeds fluid from the upper working chamber of the inner cylinder into the adjustable valve for regulation into the reserve chamber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a cross-sectional view showing the operation of an adjustable damper with valve mounted in-line according to the second embodiment of the present invention; and FIG. 7 is a cross-sectional view showing the operation of an adjustable damper with valve mounted in-line according to the second embodiment of the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
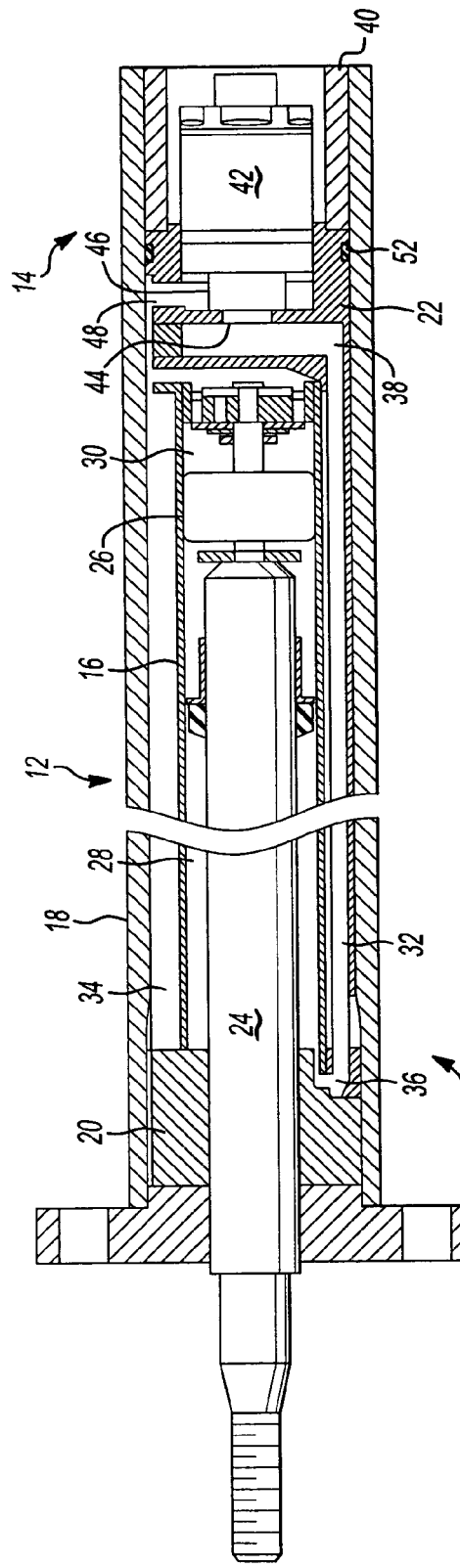
FIG. 1 is a cross-sectional view of an adjustable damper with valve mounted in-line according to a first embodiment of the present invention.

Referring now to FIG. 1, a first embodiment of the present invention is shown and described. In FIG. 1, a damper 10 includes a fluid movement portion 12 and an adjustable valve 14.

Fluid movement portion 12 includes an inner cylinder 16 and an outer cylinder 18. Preferably, inner cylinder 16 and outer cylinder 18 are coaxially aligned, such that the central axis of the inner cylinder 16 is the same as the that of outer cylinder 18. An upper rod guide 20 and a lower support 22 maintain inner cylinder 16 and outer cylinder 18 in position. Upper rod guide 20 slidingly supports a rod 24 such that rod 24 can slide up and down within inner cylinder 16. At one end of rod 24 is a valve 26. Valve 26 allows fluid to pass through at a resistance desired to properly damp vibrations. An upper working chamber 28 is defined by an area between valve 26, inner cylinder 16, and upper rod guide 20. Likewise, a lower working chamber 30 is defined by inside inner cylinder 16 on a side of valve 26 opposite to upper rod guide 20. A down tube 32 connects upper working chamber 28 with a reserve chamber 34

Reserve chamber 34 is defined by the space between outer cylinder 18 and inner cylinder 16. Reserve chamber 34 serves to compensate for the difference in volume between upper working chamber 28 and lower working chamber 30 by virtue of rod 24. Down tube 32 is a cylindrical tube that extends from a passage 36 to a valve entrance 38.

Adjustable valve 14 includes lower support 22, an end cap 40 and an adjustable valve portion 42. Lower support 22 clamps the outer periphery of adjustable valve portion 42 to maintain adjustable valve portion 42 in axial alignment with rod 24, inner cylinder 16 and outer cylinder 18. Likewise, end cap 40 slides inside outer cylinder 18 and presses against lower support 22 to seal adjustable valve portion 42 therein. Preferably, adjustable valve portion 42 is maintained within outer cylinder 18. This serves to protect the valve from the external environment and the possibility of being damaged by external elements. Moreover, adjustable valve portion 42 is preferably cylindrical, having an axis that is aligned with that of inner cylinder 16 and outer cylinder 18. This allows the overall device to be streamlined and more compact.

Valve entrance 38 communicates with a valve entrance 44 and a valve exit 46 communicates with reserve chamber 34 through a passage 48. As is understood, adjustable valve portion 42 regulates flow resistance from fluid traveling from valve entrance 38, through adjustable valve portion 42 and into passage 48. This regulation can be responsive to driver requirements, vehicle CPU requirements, or any other requested input.

Figure 4:
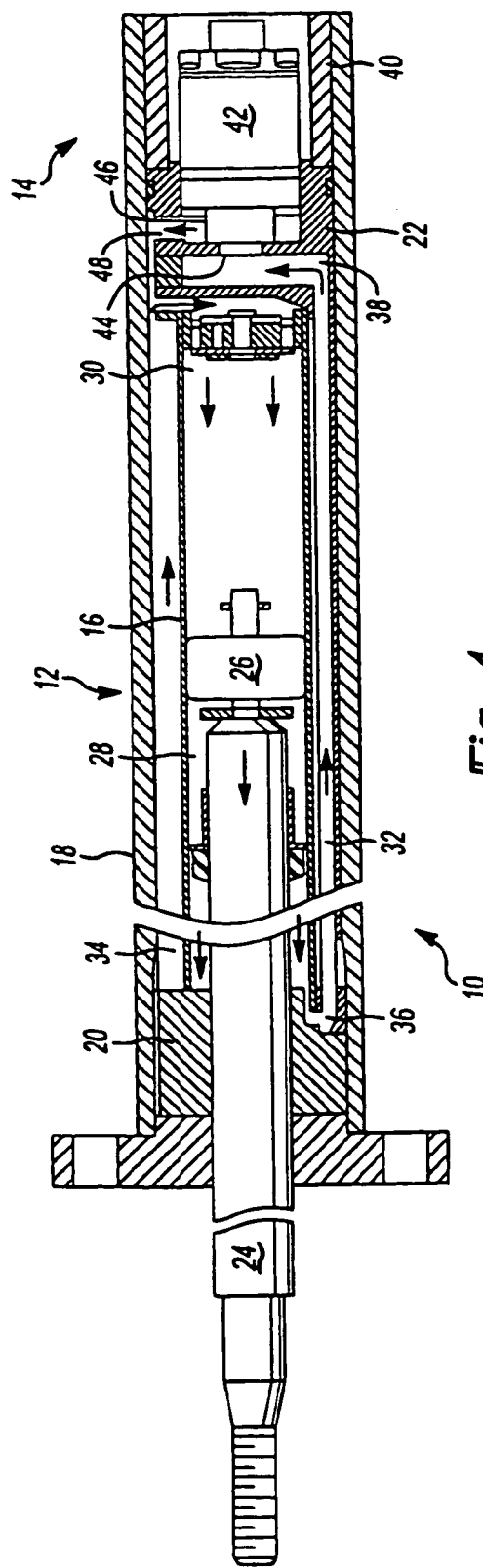
FIG. 4 is a cross-sectional view showing the operation of an adjustable damper with valve mounted in-line according to the first embodiment of the present invention.
Figure 5:
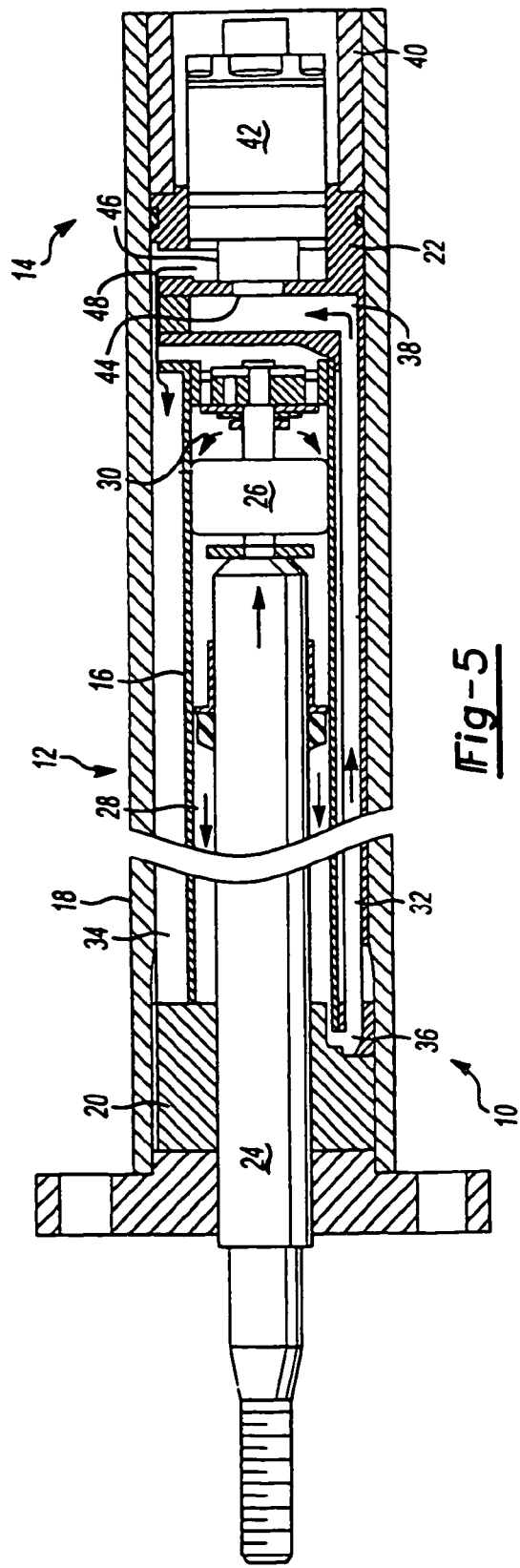
FIG. 5 is a cross-sectional view showing the operation of an adjustable damper with valve mounted in-line according to the first embodiment of the present invention.

Referring now to FIGS. 4 and 5, the operation of the present invention is shown and described. In FIG. 4, an extension stroke is illustrated where rod 24 is being moved outward and away from adjustable valve 14. Here, valve 26 is designed to allow a small amount of fluid to flow from upper working chamber 28 to lower working chamber 30 at low piston speeds. As a result, the majority of fluid is pumped from upper working chamber 28, through passage 36 and into down tube 32. From here, fluid is passed from down tube 32, through valve entrance 38 and into adjustable valve portion 42. Adjustable valve portion 42 then regulates the flow of fluid into passage 48 and into reserve chamber 34. Likewise, in FIG. 5, a compression stroke is illustrated where valve 26 is moved toward adjustable valve portion 42. Valve 26 allows fluid to flow from lower working chamber 30, through valve 26 and into upper working chamber 28. From here, due to the rod volume effect, fluid flows from upper working chamber 28, through passage 36 and into down tube 32. Fluid then flows into valve entrance 38, through adjustable valve portion 42 into passage 48 and into reserve chamber 34.

Figure 2:
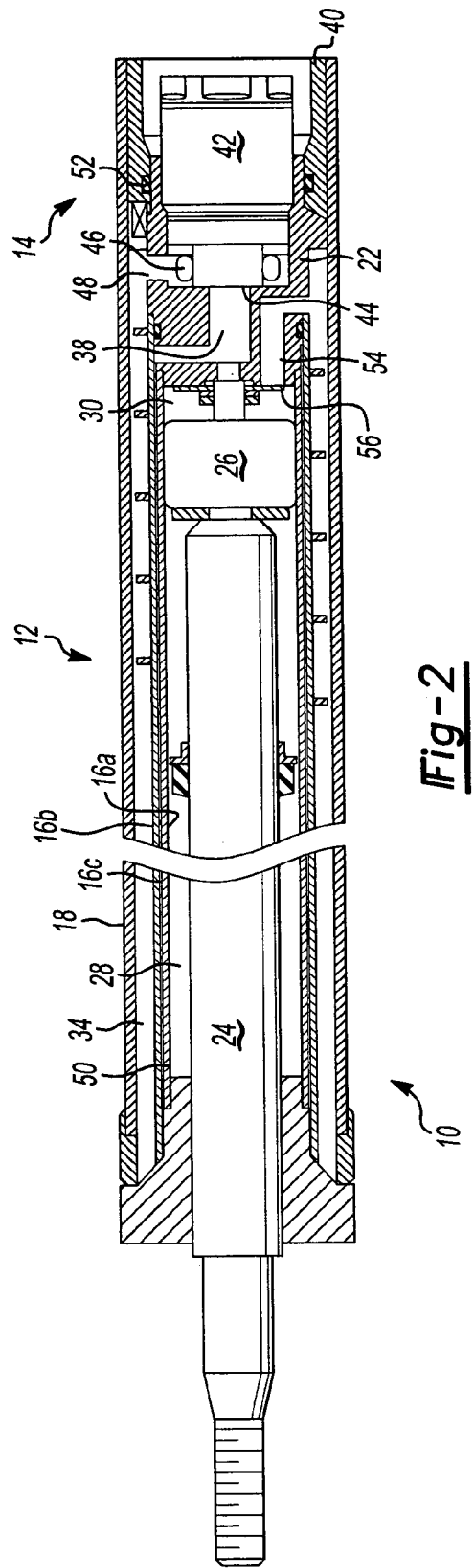
FIG. 2 is a cross-sectional view of an adjustable damper with valve mounted in-line according to a second embodiment of the present invention.

Referring now to FIG. 2, a second embodiment of the present invention is shown and described. In FIG. 2, a first inner cylinder 16a and a second inner cylinder 16b are concentrically disposed to separate upper working chamber 28 and lower working chamber 30 from reserve chamber 34. Moreover, first inner cylinder 16a and second inner cylinder 16b are spaced slightly apart to provide a gap 16c. An aperture 50 fluidly connects upper working chamber 28 with gap 16c.

Adjustable valve 14 includes adjustable valve portion 42, lower support 22, and end cap 40. A seal 52 ensures that leakage does not occur between end cap 40 and lower support 22.

In lower support 22, a plurality of passages are provided therein to allow fluid flow between the reserve chamber and the upper and lower working chambers. Specifically, passage 48 connects reserve chamber 34 and adjustable valve portion 42, valve entrance area 38 connects valve entrance 44 and gap 16c, and a passage 54 connects lower working chamber 30 with reserve chamber 34.

A series of valves ensures that fluid moves throughout the entire damper 10 in certain directions under certain resistances. Specifically, a valve 56 is a leaf-like valve that allows fluid flow only in a direction from reserve chamber 34 to lower working chamber 30. Valve 26 allows fluid flow from lower working chamber 30 to upper working chamber 28. Adjustable valve portion 42 regulates fluid flow from valve entrance area 38 to passage 48. This regulation is dependent upon feedback from a vehicle driver, vehicle central processing unit, or other type of feedback device. By way of a non-limiting example, adjustable valve 42 can adjust the fluid resistance therethrough based on an external signal from an air spring. The adjustable valve portion then adjusts the flow resistance to obtain the best flow resistance to obtain the best damping characteristics for the given pressure in the air springs. As adjustable valves are complicated in construction, when compared to fixed resistance valves, they tend to be large. Therefore, they have traditionally been required to be positioned external to the outer cylinder, as the area inside the damper has been typically unable to support the adjustable valve portion.

Referring now to FIG. 6 and FIG. 7, the operation of the second embodiment of the present invention is described. In FIG. 6, a compression stroke is illustrated where rod 24 is shown being moved toward adjustable valve portion 42. This compression causes fluid in lower working chamber 30 to travel through valve 26 and into upper working chamber 28. As the volume of lower working chamber 30 does not include rod 24, the rod volume effect causes excess fluid to flow into upper working chamber 28. Therefore, the excess fluid is forced from upper working chamber 28, through aperture 50 and into gap 16c. From here, fluid flows from gap 16c, through valve entrance area 38 and into adjustable valve portion 42. Next, fluid flows from adjustable valve portion 42 into reserve chamber 34. In FIG. 7, an extension stroke is illustrated where rod 24 is moved in a direction away from adjustable valve portion 42. Here valve 26 is designed to allow a small amount of fluid to flow from upper working chamber 28 to lower working chamber 30 at low piston speeds. As a result, the majority of fluid comes from reserve chamber 34, through passage 54, through valve 56 into lower working chamber 30.

Figure 3:
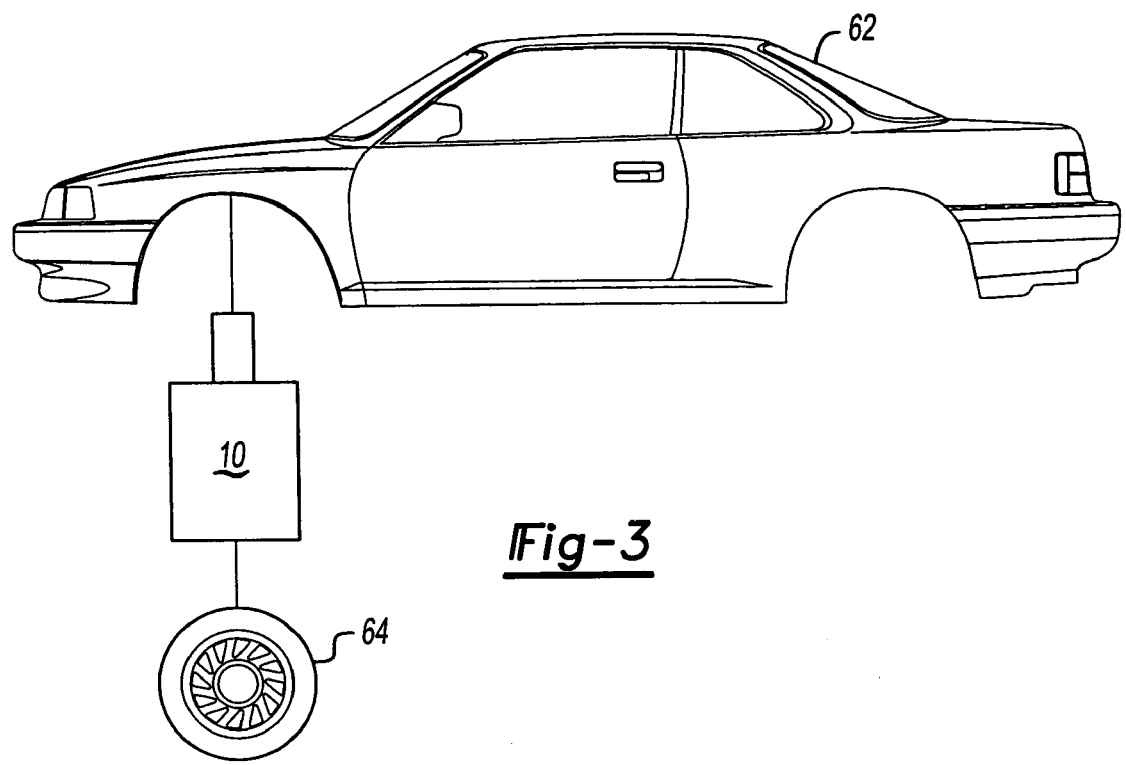
FIG. 3 is a schematic view of a vehicle using an adjustable damper with valve mounted in-line according to the present invention.

Referring now to FIG. 3, damper 10 is shown used on a vehicle. Here, a sprung mass (vehicle body) 62 is connected to an un-sprung mass (wheel) 64. Specifically, rod 24 attaches to vehicle body 62 and outer cylinder 18 attaches to wheel 64. As a result, up and down movements of wheel 64 cause rod 24 to move with respect to outer cylinder 18, thereby moving fluid as described above to absorb vibration.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A damper for absorbing vibration transmitted from an un-sprung mass to a sprung mass on a vehicle, the damper comprising:

an outer cylinder;

an inner cylinder disposed inside the outer cylinder, a space between the inner cylinder and the outer cylinder defining a reserve chamber;

a valve slidingly engaging an inner wall of the inner cylinder, the valve dividing the inner cylinder into an upper working chamber and a lower working chamber;

a rod attached to the valve and extending along an axis of the outer cylinder and the inner cylinder; and an adjustable valve positioned inside the outer cylinder, the adjustable valve fluidly connecting the upper working chamber and the lower working chamber with the reserve chamber, the adjustable valve defining damping characteristics for the damper by providing a variable flow resistance to fluid flowing between the upper working chamber and the reserve chamber responsive to an external signal.

2. The damper as claimed in claim 1, wherein the adjustable valve has a cylindrical outer surface that is axially aligned with the inner cylinder and the outer cylinder.

3. The damper is claimed in claim 1, wherein the inner cylinder comprises a first inner cylinder and a second inner cylinder, the first inner cylinder positioned inside and spaced from the second inner cylinder to form a gap, connects the upper working chamber being in communication with the gap, the gap fluidly communicating with the adjustable valve portion to fluidly communicate with the reserve chamber through the adjustable valve portion.

4. The damper as claimed in claim 1, further comprising a lower support positioned within and supported by the outer cylinder, the lower support having an aperture therein to support the adjustable valve.

5. The damper as claimed in claim 4, further comprising a valve entrance area fluidly connected to a valve entrance of the adjustable valve and fluidly connected to the upper working chamber, the valve entrance area passing through the lower support.

6. The damper as claimed in claim 4, wherein the lower support further comprises a passage that connects a valve exit of the adjustable valve with the reserve chamber.

7. A damper for absorbing vibrations between a sprung mass and an un-sprung mass of a vehicle, the damper comprising:
  an outer cylinder;
  an inner cylinder positioned inside of and coaxially aligned with the outer cylinder, a space between the inner cylinder and the outer cylinder defining a reserve chamber;
  an upper rod guide positioned at a first end of the inner cylinder and a first end of the outer cylinder;
  a rod slidingly engaged with the rod guide, a portion of the rod positioned inside the inner cylinder, a first end of the rod extending to a location external to the upper rod guide;
  a valve attached to a second end of the rod, the valve in sliding engagement with an inside wall of the inner cylinder, an area inside the inner cylinder between the valve and the upper rod guide defining an upper working chamber, an area inside the inner cylinder on a side of the valve distally located from the upper rod guide being defined as a lower working chamber;
  a down tube extending through the reserve chamber, a first end of the down tube being connected to the upper working chamber;
  an adjustable valve portion; and
  a lower support positioned and supported by an inner wall of the outer cylinder, the lower support having an aperture that supports the adjustable valve portion, the lower support having a valve entrance area that fluidly connects a second end of the down tube to a valve entrance area of the adjustable valve portion, the lower support having a passage that connects a valve exit of the adjustable valve portion to the reserve chamber, the adjustable valve portion providing a variable flow resistance to fluid flowing between the upper working chamber and the reserve chamber responsive to an external signal.

8. The damper as claimed in claim 7, wherein the adjustable valve portion is positioned inside the outer cylinder.

9. The damper as claimed in claim 8, wherein the adjustable valve portion is cylindrical, the adjustable valve portion being coaxial with the inner cylinder and the outer cylinder.

10. A damper for absorbing vibrations between a sprung mass and an un-sprung mass of a vehicle, the damper comprising:
  an outer cylinder;
  a first inner cylinder positioned inside of and coaxial with the outer cylinder;
  a second inner cylinder positioned inside the outer cylinder and outside the first inner cylinder, the second inner cylinder defining a first passage;
  an upper rod guide positioned at first ends of the outer cylinder, first inner cylinder, and second inner cylinder;
  a rod slidingly engaged with a bore of the upper rod guide, a first end of the rod extending to a location external to the first inner cylinder, a second end of the rod being inside the first inner cylinder;
  a valve attached to the second end of the rod, the valve being in sliding engagement with an inner wall of the first inner cylinder, an area inside the first inner cylinder between the upper rod guide and the valve defining an upper working chamber, an area on a side of the valve inside the first inner cylinder distally located from the upper rod guide defining a lower working chamber, the upper working chamber fluidly communicating with the first passage;
  an area between the first inner cylinder and the outer cylinder defining a reserve chamber;
  an adjustable valve portion fluidly communicating between the first passage and the reserve chamber, the adjustable valve portion determining damping characteristics for the damper by providing a variable flow resistance to fluid flowing between the upper working chamber and the reserve chamber responsive to an external signal; and
  a lower support engaged with an inner wall of the outer cylinder, the lower support having an aperture that supports the adjustable valve portion, the lower support having a valve entrance area that fluidly communicates between the first passage and the adjustable valve portion, a second passage that communicates between a valve exit of the adjustable valve portion and the reserve chamber.

11. The damper as claimed in claim 10, wherein the adjustable valve portion is cylindrically shaped, the adjustable valve portion being coaxial with the first inner cylinder and the outer cylinder.

12. The damper as claimed in claim 11, wherein the adjustable valve portion is positioned inside the outer cylinder.

13. A vehicle comprising:
  a sprung mass;
  an un-sprung mass;
  a damper connecting the sprung mass to the un-sprung mass, the damper absorbing vibrations between the sprung mass and the un-sprung mass, the damper further including:
    an outer cylinder;
    an inner cylinder positioned inside the outer cylinder, an area between the inner cylinder and the outer cylinder defining a reserve chamber;
    a rod guide supporting first ends of the inner cylinder and the outer cylinder;

a rod slidingly engaged with the rod guide, a first portion of the rod extending external to the inner cylinder and a second portion of the rod extending inside the inner cylinder;

a valve attached to the second portion of the rod, the valve slidingly engaged with an inner wall of the inner cylinder, an area inside the inner cylinder between the valve and the rod guide defining an upper working chamber, an area on a side of the valve distal from the rod guide and inside the inner cylinder defining a lower working chamber;

an adjustable valve portion;

a lower support engaged with an inside wall of the outer cylinder, the lower support having an aperture that supports the adjustable valve portion, the adjustable valve portion fluidly communicating the upper working chamber with the reserve chamber, the adjustable valve portion defining damping characteristics for the damper by providing a variable flow resistance to fluid flowing between the upper working chamber and the reserve chamber responsive to an external signal.

14. The vehicle as claimed in claim 13, wherein the adjustable valve portion is coaxial with the inner cylinder and the outer cylinder.

15. The damper as claimed in claim 14, wherein the adjustable valve portion is positioned inside the outer cylinder.

* * * * *